(12) United States Patent
Sanchez

(10) Patent No.: US 8,643,998 B2
(45) Date of Patent: Feb. 4, 2014

(54) SYSTEM FOR PROTECTING WIND TURBINES AGAINST ATMOSPHERIC DISCHARGES

(75) Inventor: Jesus Almazan Sanchez, Madrid (ES)

(73) Assignee: Lineas y Cables, S.A., Madrid (ES)

( * ) Notice: Subject to any disclaimer, the term of this patent is extended or adjusted under 35 U.S.C. 154(b) by 149 days.

(21) Appl. No.: 13/394,831

(22) PCT Filed: Sep. 17, 2010

(86) PCT No.: PCT/ES2010/000384
§ 371 (c)(1), (2), (4) Date: Mar. 8, 2012

(87) PCT Pub. No.: WO2011/042576
PCT Pub. Date: Apr. 14, 2011

(65) Prior Publication Data
US 2012/0162845 A1 Jun. 28, 2012

(30) Foreign Application Priority Data
Oct. 6, 2009 (ES) .................. P200930806

(51) Int. Cl.
*G03G 15/02* (2006.01)
*H05F 3/00* (2006.01)

(52) U.S. Cl.
USPC .......................................... 361/225

(58) Field of Classification Search
USPC ................................. 361/212–235
See application file for complete search history.

(56) References Cited

U.S. PATENT DOCUMENTS

| | | | |
|---|---|---|---|
| 5,043,527 A * | 8/1991 | Carpenter, Jr. | 174/2 |
| 6,407,900 B1 | 6/2002 | Shirakawa et al. | |
| 6,932,574 B2 * | 8/2005 | Wobben | 416/146 R |
| 7,236,341 B1 * | 6/2007 | Carpenter, Jr. | 361/117 |
| 7,417,843 B1 | 8/2008 | Fowler | |
| 7,468,879 B2 * | 12/2008 | Rizk et al. | 361/220 |
| 2008/0017788 A1 | 1/2008 | Kraemer | |

FOREIGN PATENT DOCUMENTS

| | | |
|---|---|---|
| CN | 2308197 Y | 2/1999 |
| EP | 0320358 A1 | 6/1989 |
| JP | 2002141192 A | 5/2002 |
| JP | 2006070879 A | 3/2006 |

* cited by examiner

*Primary Examiner* — Rexford Barnie
*Assistant Examiner* — Christopher Clark
(74) *Attorney, Agent, or Firm* — Hodgson Russ LLP

(57) ABSTRACT

By means of a series of parameters taken by the plurality of sensors, the system of the invention makes it possible, via a central control unit provided with complementary programming firmware, to activate an electric-field compensating device (7) whenever there is a risk of lightning discharging over the wind turbine, in such a manner that, in the contrary case, said device remains inoperative. The electric-field compensating device (7) is associated not only with the nacelle (2) but also with the tower (1) and the blades (4) in such a manner that, between the rotor (3) and the nacelle unit (2) there is a first pair of rings (14), which are conducting, concentric and the dielectric of which is air, whilst, in the lower zone of the nacelle unit (2) there is a second pair of conducting rings (15) with similar features.

4 Claims, 3 Drawing Sheets

SYSTEM FOR PROTECTING WIND TURBINES AGAINST ATMOSPHERIC DISCHARGES

OBJECT OF THE INVENTION

The present invention relates to a system that has been specially conceived for its implementation in wind turbines, as well as in other devices subject to motion, and that may be exposed to the possibility of atmospheric discharge, in other words, lightning.

The object of the invention is to provide a system that prevents the impact of lightning on the element to be protected.

BACKGROUND OF THE INVENTION

It is well known that in the last decade there has been enormous growth in the number of wind farms, in Spain as well as abroad. As an example, at the end of 2007 Spain was the third country in terms of installed potency, behind only Germany and the US; with approximately 27,026 GWh of produced energy.

On a global level it is foreseeable that installed potency will increase in a significant manner, in the order of 170 GW in 2010; while in Spain 20,155 MW are contemplated in 2010 and 29,000 MW in 2016.

This type of facility is mainly installed in locations that are very prone to lightning impacts. As a result, in a mere tenth of a second, a bolt of lightning can cause severe damage to a wind turbine.

This damage fundamentally occurs when an atmospheric discharge strikes the blades or paddles of the wind turbine, making it necessary for the wind turbines to have effective protection systems against the impact of lightning.

In general, lightning impacts occur between the months of April and September, with the majority striking in the month of August. Recently, lightning has also been observed to strike in December. Another aspect worth noting is that the number of lightning bolts striking worldwide is increasing. Therefore, if when the counting or measurement of lightning strikes started in 1960 is taken as value 0, in 1997 this value would be around 15 and in 2007 around 100. These values indicate that the number of lightning strikes against the earth have increased on a significant scale.

Therefore, if the number of wind turbines is increasing in a geometric progression and the number of bolts of lightning also, then a higher number of impacts and, potentially, losses, affecting wind farms can also be expected.

Probably the second most important problem faced by wind farms, and, in particular, wind turbines is a bolt of lightning striking any part of it, although more specifically any of the blades. It has been estimated that 20% of wind turbine breakdowns, representing slightly more than 25% of their cost, is due to lightning impacts.

In this regard, bolts of lightning tend to strike at the highest point of a particular zone. For this reason, wind turbines are a natural target given their height in addition to their elevated location. The blades are one of the wind turbine's most expensive components, and a lightning impact can have an extremely destructive effect on an unprotected blade. For this reason, one of the most important problems in terms of blade and wind turbine technology lies in preventing the impact of lightning. Possibly, the impact of lightning and the formation of ice are the most pressing challenges in the field of electric wind power.

Although modern onshore wind turbines are increasingly large, with the ensuing increase in the risk of being struck by lightning, and offshore wind turbines are even more exposed to lightning that onshore ones, all systems however, are fitted with blades, which however large or small they are, are exposed to the impact of lightning at any given time.

Lightning impact can have a highly destructive effect on blades if these are unprotected. Different studies have shown that lightning tends to strike the part furthest away from the root of the blade because it is the highest point. In such cases, an electric arc spreads from the point of contact through other conductive components to the flange connection and can reach a temperature of 30,000° C. The result is an explosive expansion of the air inside the blade. The effects this produces include damage to the surface, pressure damage, delamination, cracks on the selected leading and trailing edges, and the melting of glue. Lightning strikes can also produce hidden damage and cause severe problems in the long term that significantly reduce the useful life of the blade.

An unprotected blade is extremely vulnerable to the impact of lightning. Therefore, to date all wind turbine blades are protected against the impact of lightning. The protection system is based on the principle of Franklin-type rods, a principle that has been discussed previously, albeit with a series of improvements which have included new materials in the lightning strike receptor in such a way that, frequently, the blades can resist the impact of lightning several times before it is necessary to change the materials used in the receptor.

In summary, blade design using current technologies is based on the fact that lightning normally strikes the tip of the blade and must be conducted to earth to be eliminated. The protection system consists of two main components: the receptors located on the surface of the blade and an internal cabling system that conducts the power of the lightning. When lightning strikes, receptors capture it and the cabling system transports the electric charge through the blade to the tower, and from there to earth. Receptors are precisely the conduction points where the lightning strikes the blade.

DESCRIPTION OF THE INVENTION

The system for protecting wind turbines proposed by the invention resolves in a fully satisfactory manner the problems set out above, given that instead of reconducting the discharge from the bolt of lightning to earth through the wind turbine, it simply allows the inhibition of the aforesaid discharge.

To this effect, the disclosed system consists of an electric field compensating device, which is connected to the blades of the wind turbine, as well as to the rest of the structure, connected to earth through the tower of the wind turbine.

Said electric field compensating device will be associated to an electric field sensor, an electro-magnetic field sensor, a sensor of the air's relative humidity, as well as to a temperature and atmospheric pressure sensor.

These sensors are used to analyse the parameters required to determine activation or deactivation of the electric field compensating device.

The parameters to be analysed include the level of ambient electric charge, likewise the level of the ambient electromagnetic field, early detection of a storm front in an omni-directional manner, wind speed, temperature, relative air humidity and atmospheric pressure.

On the basis of these parameters, and by means of the corresponding central control unit, provided with complementary programming firmware, the system activates/deactivates the electric field compensating device, which shall apply to the blades as well as to the rotor of the wind turbine or device in question, through elements in the shape of concentric rings, the dielectric of which is air, each of these rings presenting an electrical connection with the elements that form the moving elements of the wind turbine, in other words, the rotor-blades-nacelle assembly, and the nacelle-tower assembly, connected to earth.

The purpose of the electric field compensating device is to reduce the voltage gradient between the active electric energy near the wind turbine caused by the storm activity and the components that form part of the element to be protected.

Finally, it is worth noting that compensation levels from an electrical point of view measured by the different auxiliary equipment are configured by the central unit associated to the electric field compensating device.

DESCRIPTION OF THE DRAWINGS

To complement this description and with a view to contributing to a better understanding of the characteristics of the invention, in accordance with an example of a preferred embodiment thereof, a set of drawings is included as an integral part of the description, which by way of illustration but not limitation, represent the following.

PREFERRED EMBODIMENT OF THE INVENTION

Figure 1:
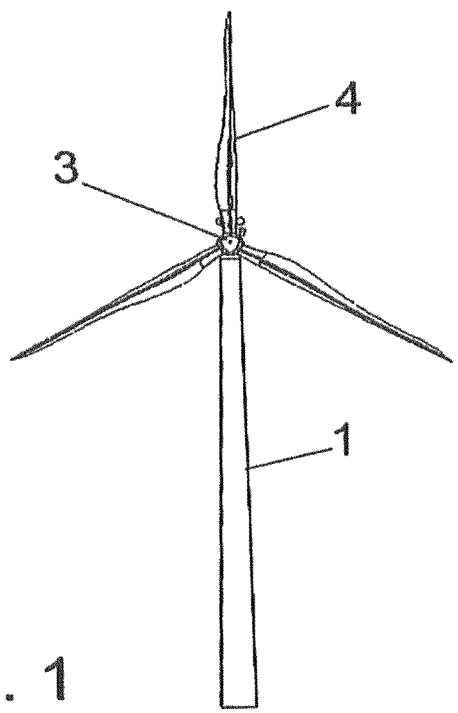
FIG. 1. Shows an elevation view of a wind turbine provided with a system for protecting wind turbines embodied in accordance with the object of the present invention.
Figure 2:
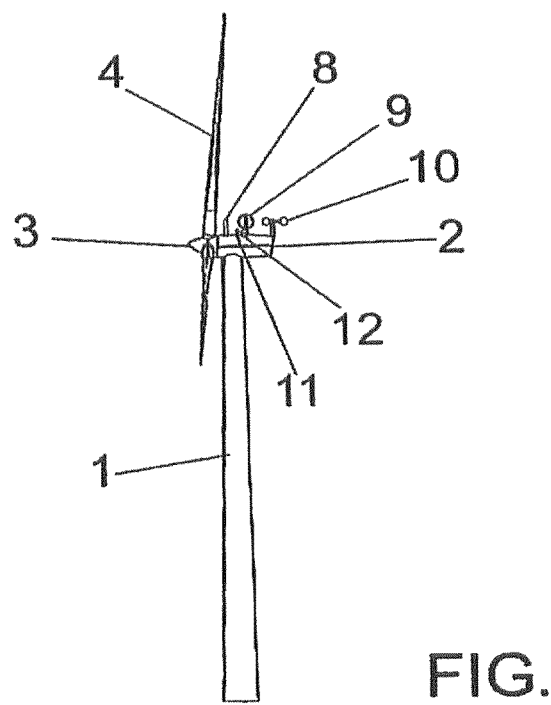
FIG. 2. Shows a profile view of the device represented in the preceding drawing.
Figure 3:
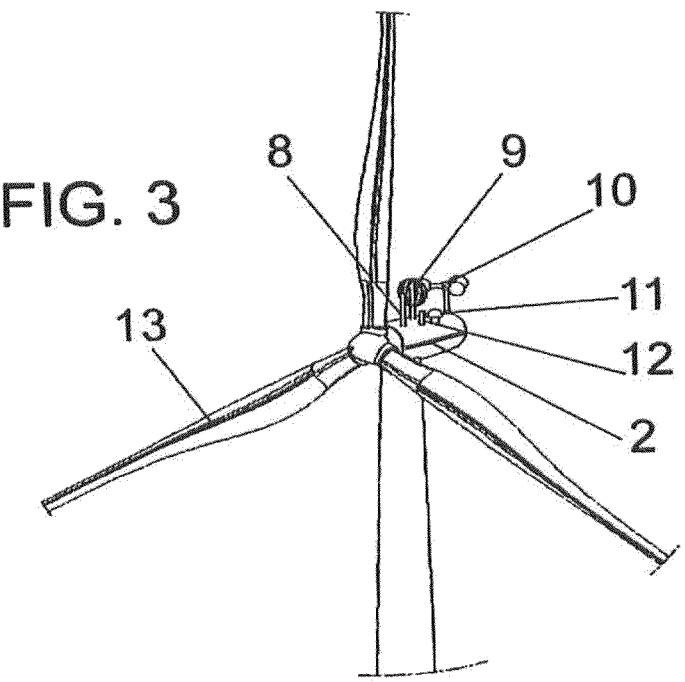
FIG. 3. Shows a close up in a front-side perspective of the nacelle of the wind generator of the preceding drawings.
Figure 4:
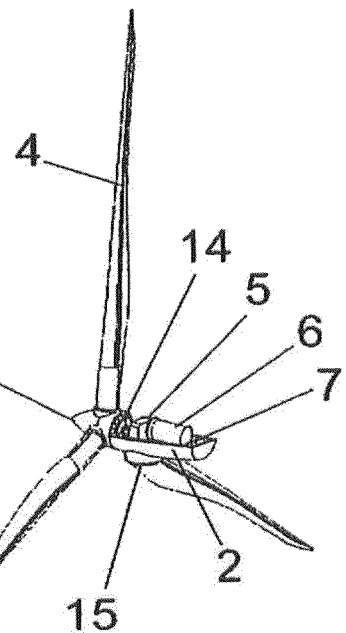
FIG. 4. Shows a view in a rear-side-top perspective of the assembly formed by the nacelle and the blades, in which the nacelle appears without its top half-shell.
Figure 5:
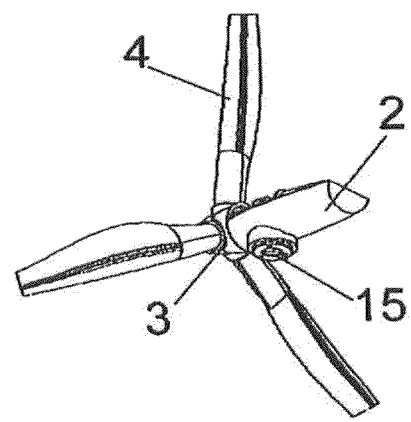
FIG. 5. Shows a view in a rear-side-bottom perspective of the assembly represented in the preceding drawing.

In the light of the aforesaid drawings it can be observed that the invention is based on the conventional structure of any wind turbine, wherein a tower (1) is defined, a self-orienting nacelle (2), and a rotor (3) to which a series of blades (4) are associated, nacelle that houses the classic mechanisms of transmission (5) and transformation (6) of the rotor's kinetic energy into electric power.

However, based on this conventional structure, it has been contemplated to establish a central control unit inside the nacelle, provided with complementary programming firmware, to which the electric field compensating device is associated (7), unit that is electrically connected to a series of devices through which the activation/deactivation of the electric field compensating device (7) is programmed.

In more specific terms, the aforesaid devices are embodied in an electric field sensor (8), an electromagnetic field sensor (9), an anemometer (10), a relative air humidity sensor (11) and a temperature and atmospheric pressure sensor (12). All of these elements will be situated externally on the top surface of the shell of the nacelle (2), and connected to the aforesaid control unit, to analyse meteorological data, and detect with sufficient time in advance the formation of storm fronts, in such a way that in the face of the slightest possible existence of the danger of lightning discharge, the unit will previously activate the electric field compensating device (7) inhibiting said discharge.

To this effect, it has been contemplated for the aforesaid device to be associated both to the nacelle (2), as well as to the tower (1) and the blades (4). More specifically, it has been contemplated that between the conductive surface (13) established in the blades and that communicates with the rotor (3) and the nacelle (2) a first pair of rings (14) is established, of a conductive nature, concentric, the dielectric of which is air, whereas on the bottom zone of the nacelle (2), in correspondence with the tilting means thereof with the tower (1), a second pair of conductive rings (15) is established, the dielectric of which is likewise air.

Figure 6:
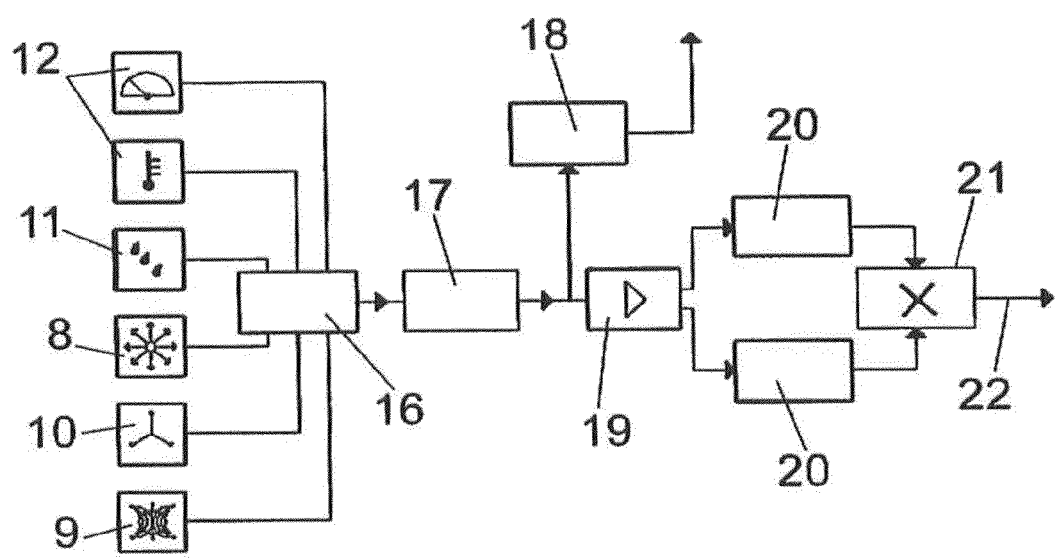
FIG. 6. Shows, finally, a block diagram of the device.

More specifically, and as can be observed from the outline of FIG. 6, the electric field compensating device consists of a series of active electronic circuits that allow pulses to be generated having a shape, amplitude and polarity according to a programme previously loaded on the device, taking into account the information received from the different sensors arranged on the wind turbine, allowing a balancing of charges between the aforesaid wind turbine and the surrounding electric field both in terms of polarity as well as voltage, thereby preventing the appearance of an atmospheric discharge on the wind turbine.

At the same time, the system allows compensation of the static electricity generated by the wind turbine through friction of the blades with the air.

For the embodiment of the system's reference circuits to earth inductive elements will be used built on insulating materials having high dielectric performances.

In a more specific manner, the electric field sensors (8), electromagnetic field sensors (9), anemometer (10), relative air humidity sensor (11) and temperature and atmospheric pressure sensor (12), are connected to a digital analogue converter (16) for their interpretation by a microcontroller (17), which can incorporate a control interface (18) via radio, microcontroller (17) to the output of which an adapter (19) is connected, connected to a pair of electric field generators (20) that in collaboration with a coupler (21) are connected through the output (22) to the structure of the wind turbine as has been commented above.

In this manner the electric field generated by the blades in their friction with the air can be compensated, as well as of the entire assembly made up of the wind turbine, only at the times that it is necessary, obviously for economic reasons, in other words, in those situations where there is a risk of lightning discharge, the electric field compensating device (7) remaining inoperative during the long periods when there is no risk of an electric storm.

The invention claimed is:

1. System for protecting a wind turbine against atmospheric discharges, wherein the wind turbine has a self-orienting nacelle (2) comprising a transmission (5) and a generator (6), and a rotor (3) having blades (4), wherein a surface of the blades has a conductive surface (13), the system comprising:

a programmable central control unit located within the nacelle (2) and in communication with an electric field compensating device (7), an electric field sensor (8), an electromagnetic field sensor (9), an anemometer (10), a relative air humidity sensor (11), and a temperature and atmospheric pressure sensor (12);

wherein the electric field compensating device (7) is associated to the nacelle (2) and the blades (4) by a first pair of concentric rings (14), located between the rotor (3) and the nacelle (2), the rings being conductive and a dielectric between the rings being air;

wherein the electric field compensating device (7) is associated to the nacelle (2) and a tower (1) by a second pair of concentric rings (15) located between a bottom of the nacelle (2) and the tower (1), the rings being conductive and a dielectric between the rings being air.

2. The system of claim 1, wherein the electric field compensating device (7) further comprises:
- a digital analogue converter (16) to connect the programmable central control unit to the electric field sensor (8), the electromagnetic field sensor (9), the anemometer (10), the relative air humidity sensor (11), and the temperature and atmospheric pressure sensor (12);
- an adapter (19) connected to an output of the programmable central control unit;
- a pair of electric field generators (20) connected to the adapter (19), the electric field generators (20) being connected to an output (22) of the electric field compensating device (7) by way of a coupler (21); and
- wherein the electric field compensating device (7) is connected to the wind turbine by way of the output (22).

3. The system of claim 1, wherein the electric field compensating device (7) further comprises a control interface (18) connected via radio.

4. The system of claim 1, wherein the programmable central control unit is a microcontroller.

\* \* \* \* \*